United States Patent Office 3,411,988
Patented Nov. 19, 1968

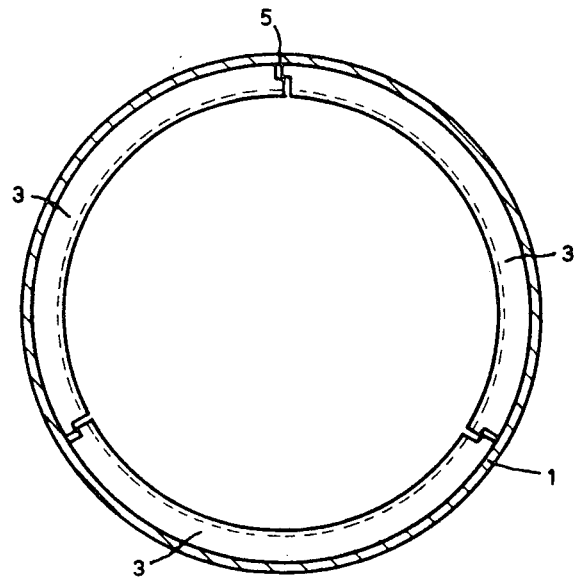
FIG 2
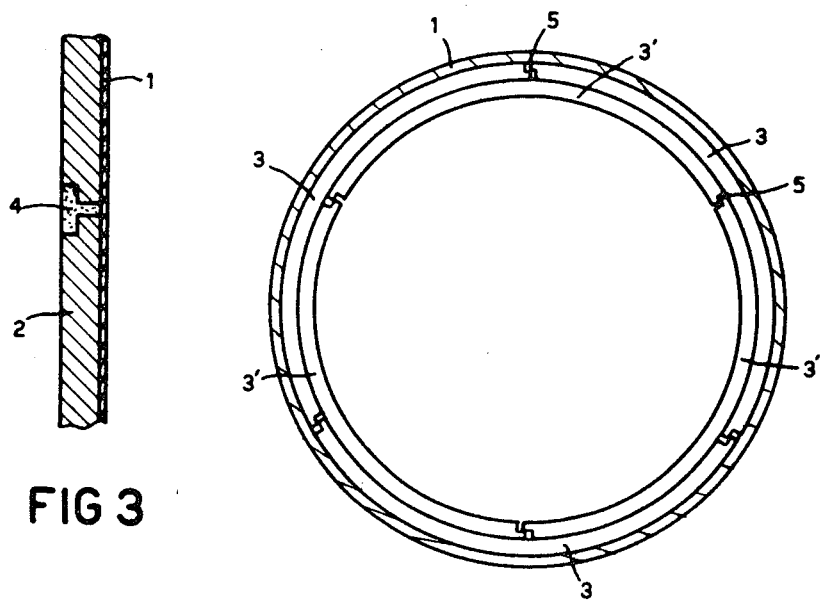
FIG 3
FIG 4

3,411,988
NUCLEAR REACTOR COOLING CHANNEL
WITH INTERNAL SOLID INSULATION
Jacques Dufresne, Varese, Flaviano Farfaletti-Casali,
Milan, and Giuseppe Volta, Ispra, Italy, assignors to
European Atomic Energy Community (Euratom), Brussels, Belgium.
Filed June 1, 1967, Ser. No. 642,771
Claims priority, application Italy, June 14, 1966,
19,040/66
7 Claims. (Cl. 176—87)

ABSTRACT OF THE DISCLOSURE

A pressure tube for a nuclear reactor having internal heat insulation formed by a series of hollow cylinders along the tube. Each cylinder is composed of sectors mating along adjacent longitudinal edges. A pressure ring is mounted between the ends of each adjacent pair of cylinders and supports them against the inside surface of the pressure tube.

---

Figure 1:
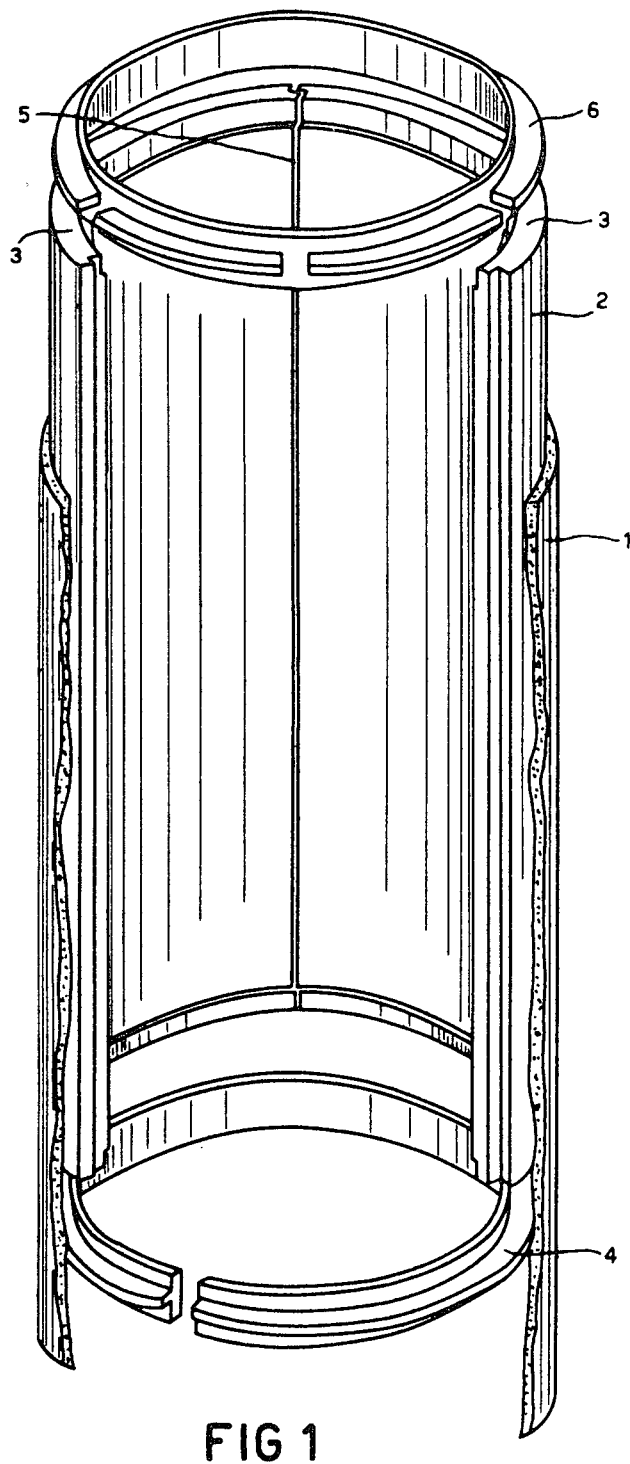

The invention relates to the construction of a nuclear reactor cooling duct or pressure tube having a solid heat insulator composed of individual members and disposed inside the tube against its inside wall. Such a tube contains the fuel and a coolant and the insulator limits the temperature reached by the tube which is accordingly known as a cold tube.

Nuclear reactor cooling ducts are known which comprises a cold pressure tube having an internal insulator formed by one or more superimposed hollow cylinders of unitary construction. Although the heat insulation afforded by this construction is satisfactory from the point of view of economics and simplicity, it is not free from disadvantages from the operational point of view. These disadvantages are mainly due to the fact that the prior art unitary insulators are generally made of a fragile material and lack any kind of metallic supporting structure, so that under the stresses to which they are exposed uncontrollable breakages and detachments may take place, with consequent variations in thermal and neutron flux. Cooling ducts are also known which comprise a cold pressure tube whose internal insulation is formed by a porous metal oxide sprayed onto the inside of the tube (generally zirconium oxide sprayed onto the inside of a Zircaloy tube).

However, this last method has the disadvantage that the sprayed metal oxide is inevitably porous, so that once it is permeated with organic coolant material its heat insulating properties are very badly reduced and the neutron economy of the system deteriorates and changes, swelling and detachments may occur as a result of the organic material penetrating into the pores and as a result of irradiation.

Another disadvantage is the low mechanical resistance of the oxide, which is formed by a very fragile deposit which easily crumbles and is held to the pressure tube only by its adhesive properties; no reinforcing structure can be used.

Attempts have been made to render the sprayed oxide impermeable by using a thin surface layer of glass, but this is in any case too delicate and fragile to be able to stay in contact with the fuel elements, more particularly during handling operations.

To obviate these disadvantages, the invention proposes a cooling duct comprising a cold pressure tube and a heat insulator, composed of individual members of solid material disposed inside the tube and urged against its inside wall so as to form an assembly which can very easily be constructed and is therefore economically advantageous, and has a high safety factor in operation and satisfactory neutron and thermal properties.

The invention accordingly provides a pressure tube for a nuclear reactor, having internal heat insulation comprising a series of hollow cylinders along the tube, each cylinder being composed of sectors which mate along their longitudinal adjacent edges and, between the ends of each pair of adjacent cylinders, a pressure ring which engages the sectors and supports them against the inside surface of the pressure tube.

One of the advantages of the invention resides in the fact that the duct is constructed without special equipment, using commercially available tubes without severe limitations or tolerances. The members forming the insulating material can be carbon or on a carbon base and be impermeable so that, in one given thickness or in a number of superimposed members of smaller thickness, they can be used without any special limitations on the total thickness and in direct contact with the cooling fluid, which can be an organic liquid. The members are robust and, since they are not subjected to high thermal stresses or to harmful deformations in general, they cannot develop high stresses, even as a result of continuously repeated operational cycles.

Even possible variations in dimensions as a result of radiation would have no effect on the stability of the system, since they would merely cause slight variation in the clearances between the members kept constantly adhering to the cylindrical wall of the tube. Any breakage or detachment of a member is obviously confined to that member and cannot spread to the adjacent members, since they are independently supported.

Any organic liquid circulating inside the insulating cylinders which might remain stagnant between the insulating members and the pressure tube may at worst be subject to radiolysis, but can cause no special inconvenience, since the zone affected is so small.

More specifically the invention provides a nuclear reactor cooling duct formed by a single, cold, pressure tube, characterized by a solid heat insulator within the tube formed by a series of hollow cylinders composed of sectors, stacked one above the other, the contacting generatrices of one sector being shaped to match the generatrices of the adjoining sectors and by rings separating the cylinders, the rings being adapted to retain and support the cylinders against the inside surface of the pressure tube, and the top and bottom ends of each cylinder being so profiled as to fit the profile of the rings.

According to one feature of the invention, the rings separating the cylinders are made of a resilient metallic material, are discontinuous, to increase resilience, and are so profiled as to urge the sectors composing the cylinder against the cylindrical inside surface of the pressure tube and to retain them in that position under any operational conditions and under the action of thermal expansion.

Other details and features of the invention will be explained in the following description of a specific example of the invention and some modifications thereof reference being made to the accompanying drawings, wherein:

FIGURE 1 illustrates a portion of a pressure tube, partially cut away and partially exploded, with the associated heat insulation, FIGURE 2 is a plan view of a horizontal section through the tube and insulation, FIGURE 3 shows, in vertical section, a detail of the zone where two adjacent elements of the heat insulation meet on another, and FIGURE 4 shows a different embodiment of heat insulation cylinders made of carbon or carbonic material.

FIGURES 1 to 3 show a pressure tube or cylindrical calandria tube 1, made, for instance, of Zircaloy. Disposed within the tube 1 and in contact with its inside surface is a cylinder 2 of carbon insulating material formed by a series of cylinders stacked one on top of the other and each formed by three sectors 3 (four sectors may be used in an alternative). Interposed between the superimposed cylinders are discontinuous resilient T-section metallic rings 4 which urge the individual members outwardly against the inside wall of the pressure tube. The rings also urge the stepped longitudinal edges 5 of the members into engagement. Once the various members (FIGURE 2) have expanded inside the tube a small clearance will be established therebetween along the stepped edges 5, to absorb differences in thermal expansion and limit the consequent stressing of the insulating material.

The stepped edges 5 avoid zones of discontinuity in the insulation at the longitudinal edges and the sectors are also stepped at the top and bottom ends (FIGURE 3) to mate with the profile of the resilient ring and to avoid discontinuities along the inside surface of the insulating tube.

In an alternative construction also shown in FIGURE 1, the ring is continuous (6) but resilient to allow deformations or variations in the curvature of the sectors, when differences in temperature occur.

The two constructions of rings can alternate so that each cylinder is in contact with two rings of different kinds, so that the internal insulation is made both resilient and robust. The insulator can be made of pyrolitic carbon or some material having similar neutron and thermal properties.

In the alternative embodiment shown in FIGURE 4, the cylinders of insulating material are formed by two or more superimposed thin layers, the sectors 3 in one layer being offset in relation to the sectors 3' in the or each other layer.

The invention is not restricted to the details of the foregoing examples.

What we claim is:

1. A pressure tube for a nuclear reactor, having internal heat insulation comprising a series of hollow cylinders along the tube, each cylinders being composed of sectors which mate along their longitudinal adjacent edges and, between the ends of each pair of adjacent cylinders, a pressure ring which engages the sectors and supports them against the inside surface of the pressure tube.

2. A pressure tube as claimed in claim 1 in which the ends of the cylinders are stepped on the inside and the pressure rings are of T-section, the leg of the T projecting outwardly between the ends of the cylinders and the arms of the T seating on the steps of the cylinders.

3. A nuclear reactor cooling duct formed by a single, cold, pressure tube, characterized by a solid heat insulator within the tube formed by a series of hollow cylinders composed of sectors, stacked one above the other, the contacting generatrices of one sector being shaped to match the generatrices of the adjoining sectors, and by rings separating the cylinders, the rings being adapted to retain and support the cylinders against the inside surface of the pressure tube, and the top and bottom ends of each cylinder being so profiled as to fit the profile of the rings.

4. A nuclear reactor cooling duct formed by a single cold pressure tube, as set forth in claim 3, characterized in that the rings separating the cylinders are made of a resilient metallic material, are discontinuous, to increase resilience, and are so profiled as to urge the sectors composing the cylinder against the cylindrical inside surface of the pressure tube and to retain them in that position under operational conditions and under the action of thermal expansion.

5. A nuclear reactor cooling duct formed by a single cold pressure tube, as set forth in claim 3, characterized in that the rings separating the cylinders are made of a resilient metallic material and are continuous so as to allow deformations and variations in curvature in the members on variations in the temperature, while retaining the sectors composing the cylinder against the cylindrical inside surface of the pressure tube.

6. A nuclear reactor cooling duct formed by a single cold pressure tube, as set forth in claim 2, characterized in that the cylinders of insulating material are formed by at least two thin superimposed layers, the sectors forming one cylindrical layer being offset in relation to the sectors of the adjacent layers.

7. A nuclear reactor cooling duct formed by a single cold pressure tube, as set forth in claim 3 characterized in that the cylinders of insulating material are formed by at least two thin superimposed layers, the sectors forming one cylindrical layer being offset in relation to the sectors of the adjacent layers.

References Cited

UNITED STATES PATENTS 3,105,804   10/1963   Cottrell et al. _____ 176—64

REUBEN EPSTEIN, *Primary Examiner.*